April 3, 1934.                O. STADTMANN                1,953,571
                                MEAT CUTTER
                             Filed Oct. 26, 1931          2 Sheets-Sheet 1

INVENTOR.
Otto Stadtmann
BY Herbert S. Fairbanks
            ATTORNEY.

April 3, 1934.  O. STADTMANN  1,953,571
MEAT CUTTER
Filed Oct. 26, 1931    2 Sheets-Sheet 2
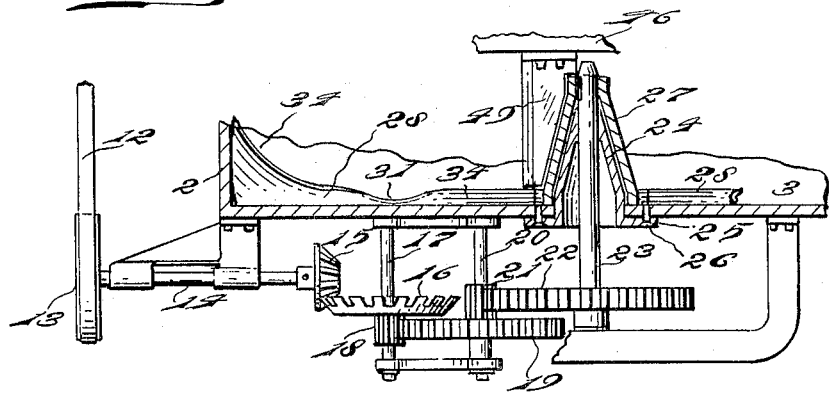
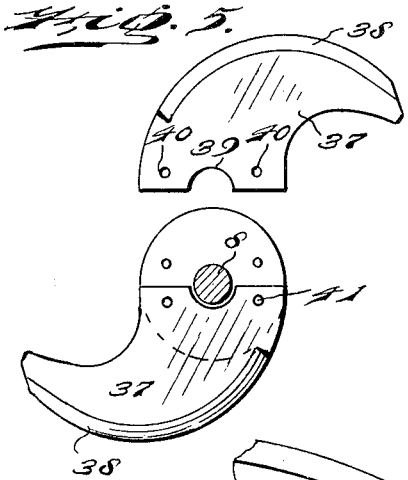
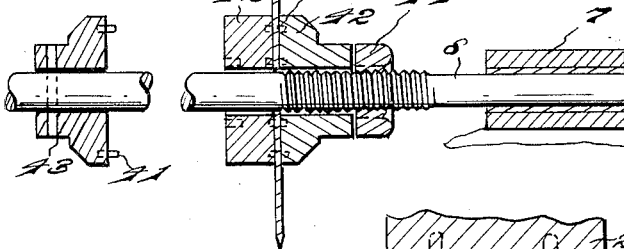
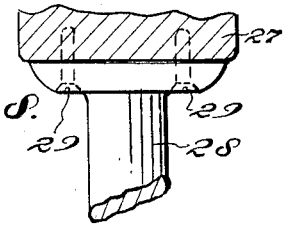
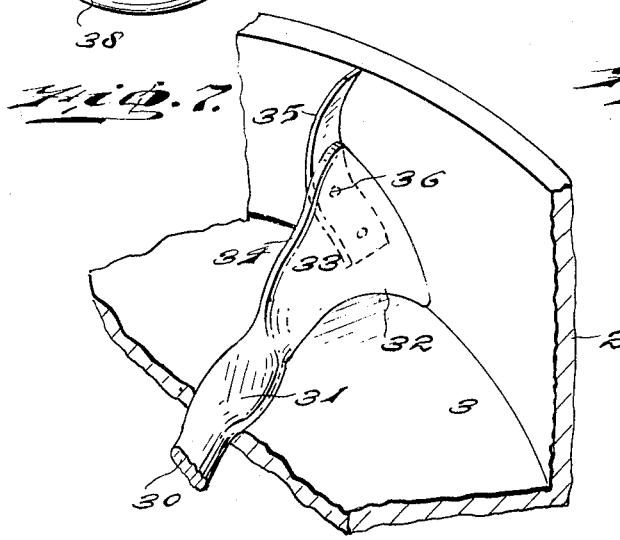

Patented Apr. 3, 1934

1,953,571

UNITED STATES PATENT OFFICE 1,953,571

MEAT CUTTER

Otto Stadtmann, Philadelphia, Pa.

Application October 26, 1931, Serial No. 571,198

3 Claims. (Cl. 146—67)

My present invention relates to a cutting machine which can be employed to cut any desired material but which is more particularly designed to be used as a meat cutter.

It has heretofore been proposed in the Hottmann Patent No. 1,488,250, dated March 25, 1924, to feed the material to be cut in a wave-like movement to the cutting mechanism, the knives of which dip down into and revolve in the material and there is no resistance to the action of the knives, such as, cones, bars, or a restricted outlet from the cutting chamber, the knives revolving freely in the fed material so that the material does not become heated during the cutting action.

I have found in the commercial manufacturing and placing on the market of a machine of this type that certain features of construction can be materially improved, and the object of my invention therefor is to improve the construction disclosed in the Hottmann patent aforesaid.

With the above in view, my invention comprehends a novel cutting machine which is particularly designed for the cutting of meat but which is not limited to such use.

It further comprehends a novel construction of housing wherein it is not necessary to raise the cutting mechanism and its shaft as in the Hottmann patent aforesaid, the housing resting permanently on a stationary casing containing the cutting chamber, and a hinged cover being provided to cover the knives, said cover also being provided with means to prevent the material being cut riding up on a cone-shaped member to which the feed members are connected.

It further comprehends a novel construction of feed members and a novel scraping blade adapted to be carried by one of said feed members.

It further comprehends a novel construction of knives and novel means for mounting the knives.

Other novel features of construction and advantage will hereinafter more clearly appear in the detailed description and the appended claims.

For the purpose of illustrating the invention, I have shown in the accompanying drawings a typical embodiment of it, which, in practice, will give satisfactory and reliable results. It is, however, to be understood that this embodiment is typical only and that the various instrumentalities of which my invention consists can be variously arranged and organized, and the invention is not limited to the precise arrangement and organization of these instrumentalities as herein set forth.

Figure 1 is a front elevation of a meat cutter embodying my invention.

Figure 2 is an end elevation thereof.

Figure 3 is a top plan view.

Figure 4 is a section elevation of a portion of the machine, the section being taken substantially on line 4—4 of Figure 3.

Figure 5 is a sectional view of the cutting shaft, showing more particularly the manner in which the cutting knives are connected therewith.

Figure 6 is a sectional view taken substantially on line 6—6 of Figure 3, showing more particularly the manner in which the knives are secured in assembled condition on their driving shaft.

Figure 7 is a perspective view, partly broken away, showing more particularly the construction of a feed member and a scraping member carried thereby.

Figure 8 is a detail view showing the manner in which a feed member is secured to its driving means.

Similar numerals of reference indicate corresponding parts.

Referring to the drawings:—

1 designates the base or supporting frame of a cutting machine embodying my invention. 2 designates a stationary casing containing a circular cutting chamber 3 into which the material to be cut is placed. This chamber is provided in its bottom with a discharge opening 4 which is controlled by means of a manually operative gate 5 so that when this gate is opened the cut material will be automatically discharged from the cutting chamber 3.

A portion of the top of the stationary casing 2 is covered by a cover 6 in the form of a casting secured to the casing 2 in any desired manner. This cover carries the journals 7 in which is mounted a shaft 8 which is connected by means of a coupling 9 with the shaft of a motor 10, which is preferably an electric motor. The coupling 9 also carries a pulley 11 around which passes a belt 12, said belt also passing around a pulley 13, mounted on a shaft 14, suitably journalled in the machine frame. This shaft 14 has fixed to it a bevelled gear 15 which meshes with a gear 16 on a shaft 17, suitably journalled on the machine frame. This shaft 17 has also fixed to it a pinion 18 which meshes with a spur gear 19, mounted on a shaft 20. The shaft 20 also has mounted on it a pinion 21 which meshes with a gear 22 fixed to the shaft 23 suitably journalled in the machine frame.

The bottom of the chamber 3 has an opening through which projects a cone-shaped bearing 24 apertured at its upper end to receive the shaft 23, and flanged at its lower end, as at 25, in order that it may be rigidly connected with the bottom of the cutting chamber by means of fastening devices 26. This cone bearing 24 has revolubly mounted on it a cone-shaped driving member 27 which, at its upper end, is keyed to the shaft 23 to revolve therewith.

The feed members 28, which effect the feed of the material to and from the cutting mechanism, travel on the bottom of the cutting chamber 3 and are connected to the base of the cone 27 by means of fastening devices 29. These feed members are constructed in a novel manner, being in the form of a bar mounted at opposite edges, and from the cone to a point centrally between the cone and the side wall of the chamber, these parts are deflected as shown at 30, and at the central portion are flattened as at 31, where the bars pass beneath the cutting mechanism. From the flattened portion 31 the free end of a feed bar curves outwardly and forwardly as at 32, and is deflected rearwardly as at 33, so that it rises a considerable distance above the bottom of the cutting chamber with an inwardly and downwardly deflected upper edge, as at 34.

In order to prevent the cut material adhering to the inner wall of the cutting chamber, I provide one of the feed members with a scraper 35 in the form of a curved flat blade secured to one of the feed members by fastening devices 36 so that it will scrape the inner periphery of the side wall of the cutting chamber. This scraper curves upwardly and forwardly and extends substantially to the top of the cutting chamber 3.

37 designates the cutting knives which are provided with a cutting edge 38 and, at their inner ends, they are provided with a hemi-spherical recess 39 and on opposite sides of such recess with apertures 40. This enables the base of a knife to be brought in close proximity to the shaft 8, and the apertures 40 are to receive the dowels 41 carried by the clamping collars 42. An end collar is fixed to the shaft by means of a pin or equivalent device 43, see Figure 6, and the opposite end collar has a clamping nut 44 in threaded engagement with the shaft 8 so that the knives are securely clamped in assembled condition. When it is desired to remove a blade for sharpening, or other purposes, all that it is necessary to do is to loosen the nut 44, separate the collars sufficiently to remove a cutting knife from the dowels, whereupon the knife can be readily removed as is apparent.

The top cover 6 has hinged thereto at 45, an auxiliary cover 46 having grasping handles 47 to facilitate the opening and closing of such auxiliary cover 46. The auxiliary cover 46 is locked in position by means of the locking members 48 in the form of pivoted cam members carried by the cover 6.

In order to prevent the material riding up on the cone 27, I provide a scraping member 49 in the form of a flat clamping blade having its inner edge in close proximity to the cone 27 and overhanging the top of such cone. The outer edge of such scraping blade 49 is curved as shown in Figure 4.

The manner in which the cutting knives are assembled is best understood by reference to Figure 5 from which it will be seen that the clamping collar is provided with the upper and lower dowel pins 41 which are received in the apertures 40 of two cutting knives. The inner ends or bases of the knives are flat and the recesses 39 provide for the bases of the knives being brought into close proximity to each other and the recesses 39 provide for the proper clearance with the shaft 8.

It will be apparent that in accordance with this invention the cover, instead of being hinged to the casing, is fixedly connected therewith so that a rigid support is provided for the bearing 7. It is therefore not necessary to raise this cover as in the Hottmann patent aforesaid in order to obtain proper access to the cutting mechanism but simply to unlock and raise up the auxiliary cover 46.

It will now be apparent that I have devised a new and useful meat cutter which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a cutting machine, a stationary casing having a controllable discharge outlet, cutting mechanism including rotatable knives extending into said chamber, feed members adapted to revolve in said chamber beneath said knives, said feed members being deflected upwardly from their inner ends towards their free ends with the central portions flattened where they pass beneath the knives and having their free ends curving outwardly and forwardly and deflected rearwardly, means to actuate said cutting mechanism, and means to actuate said feed mechanism.

2. In a cutting machine, a stationary casing having a controllable discharge outlet, a cover fixed to said casing, cutting mechanism mounted on said cover and having knives extending into said casing, an auxiliary cover hinged to said first cover to cover the knives, a cone in said casing, feed members carried by said cone, deflected upwardly and at their central portion being flattened and having their free ends curving outwardly and forwardly and deflected rearwardly and a scraping blade secured to said auxiliary cover to prevent material being treated riding up on said cone, and means to actuate said cutting mechanism and to revolve said cone.

3. In a cutting machine, a casing, rotatable knives extending downwardly into said casing, actuating means for said knives, feed members circumferentially spaced from each other and adapted to travel beneath said knives, said feed members inclining rearwardly from their inner portion with a flattened portion intermediate their ends, and terminating at their outer ends in a rearwardly and inclined forwardly directed portion, and means to revolve said feed members.

OTTO STADTMANN.